UNITED STATES PATENT OFFICE.

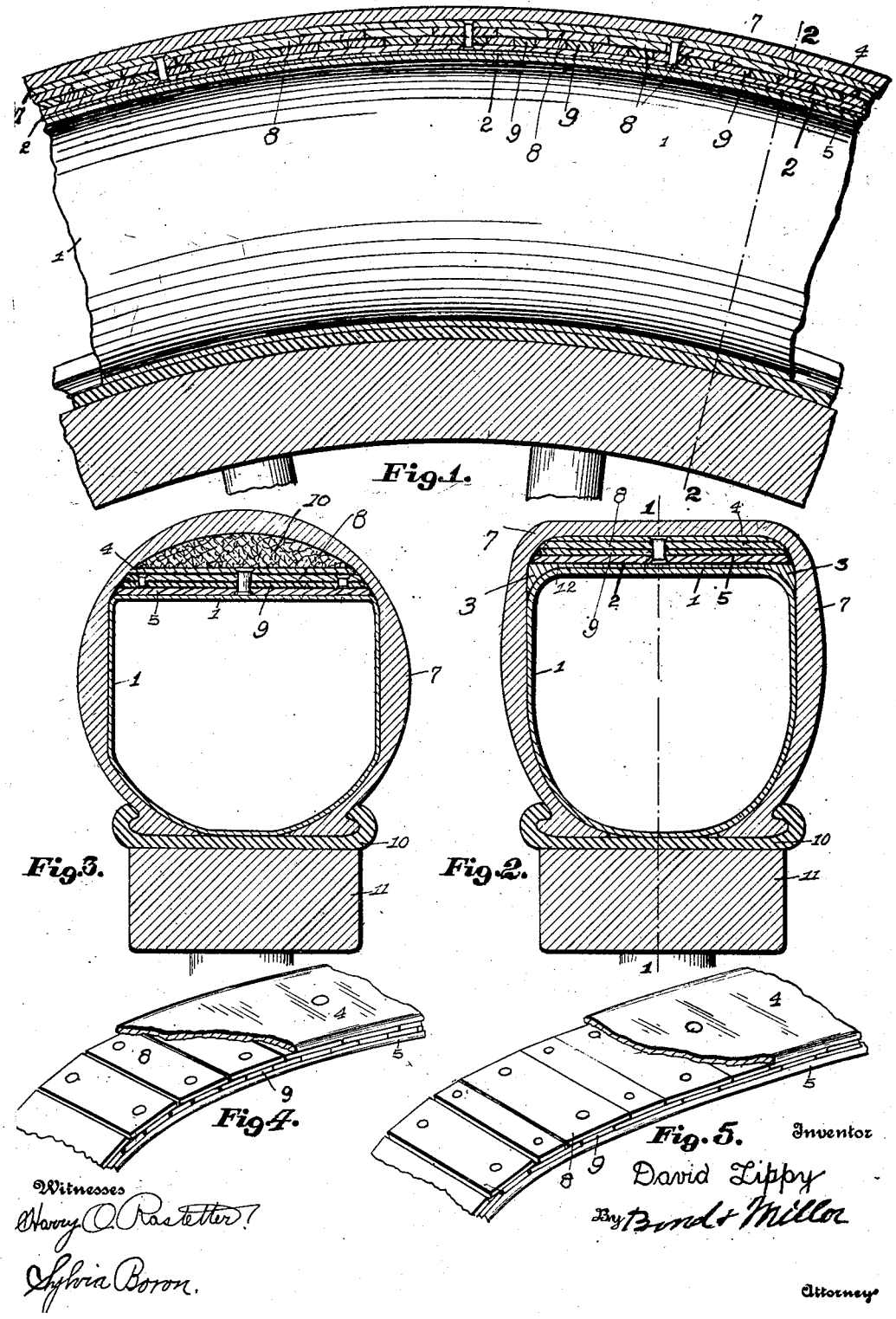

DAVID LIPPY, OF MANSFIELD, OHIO.

TIRE.

999,810.

Specification of Letters Patent.  Patented Aug. 8, 1911.

Application filed September 15, 1909. Serial No. 517,814.

*To all whom it may concern:*

Be it known that I, DAVID LIPPY, a citizen of the United States, residing at Mansfield, in the county of Richland and State of Ohio, have invented new and useful Improvements in Tires; and I do hereby declare that the following is a full, clear, and exact description of the same.

This invention relates to automobile tires, and more particularly to the armor therefor.

The invention consists in providing a plurality of plates of different widths arranged in superposed layers, and placed edge to edge, to form a convenient means for effectually resisting puncture at the tread surface.

The object of the invention is to provide a plurality of superposed plates of different widths to resist puncture and arrange them in such manner as to facilitate their assembling to snugly fit the continuity of the tire to avoid as much as possible liability of spaces for the admission of tacks or the like.

The invention also relates to improvements in the details of construction and arrangement of parts, to be hereinafter described and particularly pointed out in the claims.

In the drawings: Figure 1 is a longitudinal section of a tire constructed in accordance with my invention. Fig. 2 is a cross section of the same. Fig. 3 is a similar view, but showing the tread round instead of flat as in Fig. 2. Fig. 4 is a detail perspective view of the armor. Fig. 5 is a similar view of a different form of armor.

1 indicates a tube, which is inflated in the usual manner. On the outer periphery of the tube 1, is located a fibrous band 2, the edges of which are formed with filling strips 3, designed to support the tire parts located adjacent thereto. Interposed between the band 2 and the outer casing 7, is an armor, consisting of two bands 4 and 5, and two layers of metal plates 8 and 9. The metal plates 8 and 9 approximate the width of the tread surface of the tire, and are of different width, circumferentially thereof. The plates 9 are narrower than the plates 8, and lie against the band 5 and are placed edge to edge. The wider plates 8 approximate the cross sectional width of two of the plates 9, and are placed edge to edge and over the said latter plates 9, and next to the band 4. One of the plates 8 is centrally disposed over and secured to one of the plates 9, so that the overlapping ends of said plate 8, will extend over the upper surfaces of the adjacent smaller plates 9 so as to cause the assembled series of rows of plates to fit snugly the contour of the tire surface.

In Fig. 3 I have shown a slightly different arrangement of the plates, but covering the same generic idea. In this figure, the inner layer of plates is composed of a series of the wide and narrow plates 8 and 9, placed edge to edge, while the outer or upper series of plates are arranged in a similar manner. In each instance the wider plates are secured to the narrow plates so that the ends of the wider plates overlap.

The invention is adapted for use with a flat or round tread, and to show such use, I have illustrated the same in Figs. 2 and 3. In Fig. 2 which shows a flat tread, the band 2 is employed, while in Fig. 3 this filling band is omitted, and between the rounded tread of the casing 7, and the outer band 4, a filling 10 is inserted.

By constructing the armor as described, I effectually provide a non-puncturable tire. When load pressure is applied the extreme ends of the plates, by reason of one being of a different width than the other, they fit closely and practically close the joints.

What I claim is:

1. In a tire the combination of a tube, an armor surrounding the outside of the tube, said armor comprising two sets of plates each extending in similar regular order and arranged in layers one above the other around the circumference of the tire, the plates of each layer being arranged edge to edge and substantially abutting some of the plates being wider than the other plates, and some of the plates of one set overlapping the plates of the other set.

2. A tire comprising a tube, an armor surrounding the tube, said armor consisting of a set of narrow plates placed edge to edge and a set of wider plates arranged edge to edge, the wider plates being arranged over
5 the narrow plates, and the edges of said wider plates overlapping said narrow plates.

In testimony that I claim the above, I have hereunto subscribed my name in the presence of two witnesses.

DAVID LIPPY.

Witnesses:
   JOHN H. SPONSELLER,
   SYLVIA BORON.